(12) United States Patent
Patel et al.

(10) Patent No.: US 10,820,401 B2
(45) Date of Patent: Oct. 27, 2020

(54) OPERATING PLASMA ARC PROCESSING SYSTEMS AT REDUCED CURRENT AND GAS PRESSURE LEVELS AND RELATED SYSTEMS AND METHODS

(71) Applicant: Hypertherm, Inc., Hanover, NH (US)

(72) Inventors: Shreyansh Patel, Lebanon, NH (US); Qinghua Liu, Etna, NH (US); Junsong Mao, Hanover, NH (US); Richard Pavlik, Enfield, NH (US); Zheng Duan, Hanover, NH (US); Bruce P. Altobelli, Grantham, NH (US)

(73) Assignee: Hypertherm, Inc., Hanover, NH (US)

( * ) Notice: Subject to any disclaimer, the term of this patent is extended or adjusted under 35 U.S.C. 154(b) by 470 days.

(21) Appl. No.: 15/686,939

(22) Filed: Aug. 25, 2017

(65) Prior Publication Data

US 2018/0056430 A1 Mar. 1, 2018

Related U.S. Application Data

(60) Provisional application No. 62/380,208, filed on Aug. 26, 2016.

(51) Int. Cl.
*B23K 10/00* (2006.01)
*H05H 1/36* (2006.01)
(Continued)

(52) U.S. Cl.
CPC ............. *H05H 1/36* (2013.01); *B23K 10/003* (2013.01); *B23K 10/006* (2013.01);
(Continued)

(58) Field of Classification Search
CPC .. B23K 10/003; B23K 10/006; G05D 7/0623; G05D 7/0676; H05H 1/36; H05H 1/34;
(Continued)

(56) References Cited

U.S. PATENT DOCUMENTS 5,695,662 A 12/1997 Couch, Jr. et al.
6,133,543 A 10/2000 Borowy et al.
(Continued)

FOREIGN PATENT DOCUMENTS

JP 2001170772 6/2001

*Primary Examiner* — Mark H Paschall
(74) *Attorney, Agent, or Firm* — Proskauer Rose LLP (57) ABSTRACT

In some aspects, methods for controlling a plasma arc in a plasma torch of a plasma cutting system in a low operating current mode can include: receiving, by a computing device within the plasma power supply, a command to begin a plasma processing operation; generating a pilot arc command to generate a pilot arc within the plasma torch, the generating of the pilot arc command including directing an electrical signal and a gas flow to the plasma torch, the electrical signal being configured to generate the pilot arc at a current having a first arc amperage magnitude; and generating an operational arc command to facilitate a transition from the pilot arc to an operational plasma arc, the generating of the operational arc command including adjusting the current directed to the plasma torch to be a second arc amperage magnitude that is lower than the first arc amperage magnitude.

18 Claims, 3 Drawing Sheets

(51) Int. Cl.
*H05H 1/34* (2006.01)
*G05D 7/06* (2006.01)
*H05H 1/28* (2006.01)
*F16K 31/06* (2006.01)

(52) U.S. Cl.
CPC ......... *G05D 7/0623* (2013.01); *G05D 7/0676* (2013.01); *H05H 1/28* (2013.01); *H05H 1/34* (2013.01); *F16K 31/06* (2013.01); *H05H 2001/3426* (2013.01); *H05H 2001/3484* (2013.01); *H05H 2001/3489* (2013.01)

(58) Field of Classification Search
CPC ............ H05H 1/28; H05H 2001/3426; H05H 2001/3484; H05H 2001/3489
USPC ............ 219/121.44, 121.54, 121.57, 121.52, 219/121.55
See application file for complete search history.

(56) References Cited

U.S. PATENT DOCUMENTS

| | | | |
|---|---|---|---|
| 9,833,860 B1* | 12/2017 | Peters | B23K 9/0671 |
| 2005/0173381 A1* | 8/2005 | Delzenne | B23K 10/006 219/121.39 |
| 2008/0083713 A1* | 4/2008 | Sanders | B23K 9/013 219/121.57 |
| 2009/0057277 A1 | 3/2009 | Renault et al. | |
| 2012/0261392 A1 | 10/2012 | Barnett et al. | |
| 2015/0245459 A1 | 8/2015 | Namburu | |
| 2016/0067812 A1 | 3/2016 | Higgins et al. | |

* cited by examiner

OPERATING PLASMA ARC PROCESSING SYSTEMS AT REDUCED CURRENT AND GAS PRESSURE LEVELS AND RELATED SYSTEMS AND METHODS

RELATED APPLICATIONS

This application claims the benefit of U.S. Provisional Patent Application Ser. No. 62/380,208, filed Aug. 26, 2016, entitled "Gas Systems and Low Amperage Control," the contents of which are hereby incorporated herein by reference in their entirety.

TECHNICAL FIELD

This disclosure relates generally to plasma arc processing systems, and more specifically to operating plasma arc processing systems at reduced current and gas pressure levels and to related systems and methods.

BACKGROUND

Plasma cutting and plasma gouging are techniques for quickly removing large quantities of material from a workpiece. In applications where precise or controlled removal of material is desired, plasma operations may lack a requisite control and/or finesse to remove material without damaging or destroying other components. For example, in auto repair industry, removing spot welds can be a demanding job. A goal in removing spot welds is typically to remove the welds on the top surface or layer without damaging or cutting through the base or underlying metal. Metals spot welded together are often thin gage materials, such as mild steel, high strength steels, stainless steels or aluminum.

Currently, a common method for spot weld removal is to use special steel hardened bits to drill or mill out each spot weld. These bits can be very expensive and typically do not last more than a few spot weld removals, especially on the hard, high strength steels being used in new vehicles. For example, a good spot weld removal drill bit can cost around $80 and have a usable life of only 30-40 spot welds for mild steel and 1-2 spot welds for high-strength steel. Furthermore, this drilling/milling process can be very labor and time intensive.

SUMMARY

In some aspects, computer-implemented methods for controlling a plasma arc in a plasma torch of a plasma cutting system in a low operating current mode can include: receiving, by a computing device disposed within the plasma power supply, a command to begin a plasma processing operation; generating, using the computing device, a pilot arc command to generate a pilot arc within the plasma torch, the generating of the pilot arc command including directing an electrical signal and a gas flow to the plasma torch, the electrical signal being configured to generate the pilot arc at a current having a first arc amperage magnitude; and generating, using the computing device, an operational arc command to facilitate a transition from the pilot arc to an operational plasma arc, the generating of the operational arc command including adjusting the current directed to the plasma torch to be a second arc amperage magnitude that is lower than the first arc amperage magnitude.

Embodiments can include one or more of the following features.

In some embodiments, the operational plasma arc includes a gouging arc. In some embodiments, the first arc amperage magnitude has a value of less than about 20 A. In some embodiments, the second arc amperage magnitude has a value of less than about 15 A. In some embodiments, the second arc amperage magnitude is at least about 25% lower than the first arc amperage magnitude. In some embodiments, the generating the operational arc command includes modifying a switching frequency of an inductor of the plasma cutting system in response to a change in arc amperage magnitude. In some cases, the modifying includes tightening the control bandwidth as the arc amperage magnitude decreases.

In some embodiments, the computing device adjusts the arc amperage magnitude in a gradual manner. In some cases, the generating the operational arc command includes increasing the system bus voltage as the arc amperage magnitude decreases. In some embodiments, methods also include adjusting the pressure of the gas flow to the plasma torch based on the transition from the pilot arc to an operational plasma arc. In some cases, the adjusting the pressure includes adjusting the pressure so that a plenum pressure becomes less than about 25 PSI. For example, the adjusting the pressure includes adjusting the pressure so that a plenum pressure becomes less than about 10 PSI.

In some embodiments, the plasma torch is gas cooled.

In some aspects, methods of starting a plasma arc torch of a plasma arc torch processing system and performing a processing operation at a reduced plasma arc current can include: initiating a pilot arc in the torch between a set of consumables, the pilot arc having a pilot mode current level that is at least about 15 Amps, and providing a gas to the torch at a pilot mode gas pressure; responsive to detecting an arc transfer, initiating a transition from pilot mode to an operating mode, the initiating the transition comprising increasing a switching frequency of a power device within the plasma arc torch processing system to decrease the current provided to the consumables from the pilot mode current to an operating mode current level that is less than about 12 Amps and providing the gas to the torch at an operating mode gas pressure; and performing a plasma processing operation with the current at the operating mode current level that is less than about 15 Amps.

Embodiments can include one or more of the following features.

In some embodiments, the plasma processing operation include a gouging operation. In some embodiments, the operating mode gas pressure is less than the pilot mode gas pressure. In some embodiments, the switching frequency is at least about 50 kHz. In some embodiments, the operating mode gas pressure is less than about 25 PSI. In some embodiments, an arc transfer height with a pilot mode current level that is at least about 15 Amps is greater than about 0.3 inches.

In some aspects, gouging nozzles for a plasma arc processing torch in a low-current gouging system can include: a generally cylindrical body having: i) an open proximal end defining a plenum area; and ii) a distal end defining a floor and a bore region formed therethrough for conveying a plasma jet from the torch, where the bore region comprises: a first, distal-most frustoconical inlet portion formed along the floor of the distal end having a first axial length; a second, substantially cylindrical constricting bore having: i) a diameter matching an inner diameter of the frustoconical inlet portion and being the minimum diameter of the bore region and ii) a second axial length; and a third, counter-formed portion defined at a distal region of the substantially cylindrical constricting bore, the counterformed portion having: i) a diameter that is greater than the diameter of the substantially cylindrical constricting bore and ii) a third axial length.

Embodiments can include one or more of the following features.

In some embodiments, the third, counterformed portion includes a substantially cylindrical counterbore. In some cases, the substantially cylindrical counterbore has a diameter that is at least about 20% greater than the substantially cylindrical constricting bore. In some cases, the third axial length is at least 20% greater than the first axial length and second axial length combined. In some embodiments, the third, counterformed portion includes a frustoconical countersink. In some cases, the frustoconical countersink has a largest diameter that is greater than a largest diameter of the first, distal-most tapered inlet portion. In some embodiments, the third, counterformed portion includes a substantially cylindrical counterbore and a frustoconical countersink defined at a distal end of the substantially cylindrical counterbore. In some embodiments, the third, counterformed portion includes two substantially cylindrical counterbore portions.

In some embodiments, the third axial length is greater than the second axial length. In some embodiments, the third axial length is at least about 300% greater than the second axial length. In some embodiments, the first axial length and the second axial length are within about 20% of one another.

In some embodiments, the nozzles can include a set of vents fluidly venting the plenum area to a region outside the nozzle distally relative to the floor of the body. In some cases, the vents are substantially axially defined. In some cases, the vents are at least partially formed within a sidewall of the cylindrical body. In some cases, the vents are distributed substantially evenly about the bore region.

Embodiments described herein can have one or more of the following advantages.

For use in removing spot welds, conventional plasma gouging processes can have significant shortcomings, generally related to removing too much metal (e.g., gouging too fast or too deep) which can too easily damage the base metals. Another application for plasma gouging is weld repair where the user typically wants control on the metal removal rate during the process. However, in such processing, the user is required to visually see the defect to be removed and, in some cases, get weld inspector's approval before starting the process of re-welding the defect. It is typically difficult to see the plasma arc and control the metal removal rate, which is important to locate the weld defect. For example, in some cases, a torch tip can visually obstruct or blow an underlying workpiece/weld. Thus, using the systems and methods herein, which can be increased arc stretch, can be beneficial by allowing the torch tip to be more distanced from the workpiece.

The systems and methods described herein can be used in order to broaden the scope of removing metal with finer detail, which can be useful for many weld defect repairs, spot weld removal, and marking using plasma processing. For example, the systems and methods herein can be implemented to use plasma processes to allow plasma gouging for spot-weld removal and plasma marking for applications such as scoring, part identification, drill starts, artistic uses, etc.

To address some of the problems limiting application of conventional plasma processing for spot weld removal and weld repair industry, the systems and methods described herein can help to create a more stable plasma arc at lower plasma current. As described herein, systems and methods can beneficially include or result in: consumable designs to help stabilize plasma arcs at low amperage and higher voltage; consumable designs to sustain a highly diffused plasma arc of 2.4 MW/in$^2$, to yield a gouge cross-sectional profile having a width-to-depth ratio of at least 4.75; new plasma bore designs for 40% increase in transfer height for improved user visibility; better plasma gas control at lower pressure for stable arc; adaptive current control for variable current response at different current output settings for the system; automatic gas and current control change based on ampere and mode settings; nozzle designs to reduce (e.g., eliminate) start and end marks for uniform plasma marking; and expanded range current output for air plasma systems.

In some aspects, the systems and methods described herein can utilize a combination of one or more consumable designs, adjusted process settings and controls (e.g., to have lower amperage and gas pressure via a tunable pressure regulator), current controls and techniques to produce a high visibility and very stable low density plasma arc. Thus, the systems and methods described herein can provide superior performance that can be easier to use, easier to control, be more efficient and productive to remove spot welds and weld repair, and provide cheaper marking options than with some conventional gouging systems. For example, the torch operation techniques described herein can help make generation of stable, low amperage plasma arcs easier to achieve and can be used along with nozzle plasma bore configurations described herein to operate at lower currents (e.g., 10 amps or lower) to reduce the heat input into the metal being worked upon. In some cases, the techniques described herein allow a user to gouge a material at controlled depths in materials as thin as 24 gage steel and not gouge the other layer connected by a spot weld.

Additionally, the systems and methods described herein can soften (e.g., reduce) the light intensity from a plasma arc, which provides improved visibility through the plasma and also contributes toward depth control of metal removal during gouging.

Nozzle configurations described herein help to provide gouging profiles with better (e.g., larger) width-to-depth ratios (e.g., a ratio of around 4), under a wide range of torch orientations and speeds. As a result, increased control of metal removal rates can be achieved. Whereas, conventional systems typically yield width-to-depth ratios of only around 2. For example, consumable designs described herein, along with process controls that can include gas control (for example, nominal plenum pressure value of 25 psi), current control with much faster current response rate compared to rates at higher amperages, such as 45 amps, reduction (e.g., elimination) of a pulse width modulation (PWM) cap at 10 amps, allows for larger arc stretch, such as as high as 0.6 inches.

DETAILED DESCRIPTION

In some aspects, plasma arc processing systems (e.g., plasma arc torch systems) can be configured to operate at lower operating currents or lower plasma gas pressures in order to provide for better controlled processing operations, such as gouging in which it may be beneficial to penetrate a material without piercing all the way through the material or remove a weld from between two workpieces without damaging/piercing the underlying workpieces.

Figure 1:
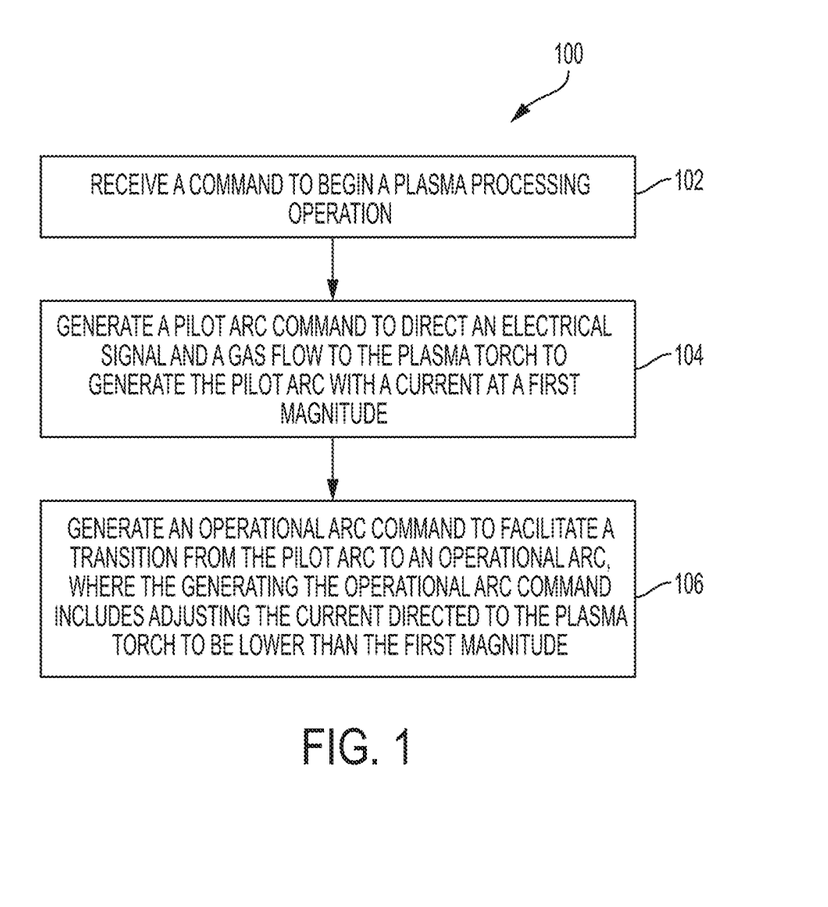
FIG. 1 is a diagram of an example method for operating a plasma arc torch in a low current mode.

Referring to FIG. 1, in some embodiments, computer-implemented methods (100) for controlling a plasma arc in a plasma torch of a plasma cutting system in a low operating current mode can include receiving, by a computing device (e.g., controller having a processor (e.g., an application-specific integrated circuit (ASIC) or a field-programmable gate array (FPGA))) disposed within the plasma power supply, a command to begin a plasma processing operation (102). For example, the command can be generated in response to a user attempting to perform an operation. In some cases, this can include a user pressing a switch or button on a torch to begin cutting, which can send a signal to a controller of the plasma cutting system. In some embodiments, the initiation signal is generated by a start button or arc on signal from a torch controller (e.g., a cnc controller). This in turn can start to supply current output from the plasma cutting system and turn on the pressure regulator to supply plasma gas.

Next, the methods can include generating, using the computing device, a pilot arc command to generate a pilot arc within the plasma torch (104). That is, the methods can include initiating a pilot arc in the torch between a set of consumables and providing a gas to the torch at a pilot mode gas pressure. For example, in response to receiving the command to begin a plasma processing operation, the controller can send a signal to initiate the pilot arc.

The generating the pilot arc command typically includes directing an electrical signal and a gas flow to the plasma torch. In the plasma arc command, the electrical signal is typically configured to generate the pilot arc at a current having a first arc amperage magnitude (e.g., first plasma current level). In some embodiments, the first arc amperage magnitude has a value of less than about 20 A. In some cases, the pilot arc has a pilot mode current level, which can be at least about 15 Amps. The pilot mode gas pressure can be at least about 8 pounds per square inch (psi) to about 10 psi.

After a pilot arc has been initiated, methods can next include generating, using the computing device, an operational arc command to facilitate a transition from the pilot arc to an operational (e.g., steady state, processing, gouging) plasma arc (106). The generating the operational arc command typically includes adjusting (e.g., altering, changing, updating) the current directed to the plasma torch to be a second arc amperage magnitude (e.g., second plasma current level). As discussed below, gas pressure can also be adjusted (e.g., lowered) after the pilot arc has been initiated.

In some embodiments, the current can be adjusted once the start of arc transfer is detected by the system. For example, once the arc has been initiated and the user attempts to perform an operation (e.g., by moving the torch to the workpiece) so that the electrode is within a certain threshold distance from the workpiece (e.g., the transfer height), the system can detect a current starting to flow to the workpiece, which can indicate that the arc is starting to transfer from the nozzle to the workpiece. Upon determining that arc transfer has started, the system can divert the current from the nozzle to the workpiece and, concurrently or some amount of time after, can begin adjusting the current to its lower operational value.

In some examples, the methods described herein can include a dual step pilot. For example, the methods can start a system at 15 amps and then lower it to implement a reverse dual threshold. That is, the current can be adjusted (e.g., in a reverse direction than conventional systems), which typically start low and ramp up current to decrease consumable wear. For example, the methods described herein can start at 15 amps, and as soon as the system starts to detect transfer, it dial down the current until it sees full transfer, then adjust the current to an operational value.

That is, the plasma current supplied to the torch can be decreased after arc transfer so that the plasma current used for a processing operation is lower than that for pilot mode. In some embodiments, the second arc amperage magnitude is lower than the first arc amperage magnitude. In some embodiments, the second arc amperage magnitude has a value of less than about 15 A. In some embodiments, the second arc amperage magnitude is at least about 25% lower than the first arc amperage magnitude.

In some embodiments, as a result of the reduced current supplied (and therefore an increase in voltage), an arc transfer height (a distance from which an electrode can be positioned from a workpiece during an operation without losing an arc) can be increased. In some cases, the arc can transfer close to the workpiece and then the torch can pull back a distance, stretching the arc for better visibility. For example, in some cases where a pilot mode current level is at least about 15 Amps, an arc transfer height is greater than about 0.3 inches. Transfer height can be an important parameter for low amperage operation, which allows the user to reach remote places for gouging metal. With elimination of a dual step pilot technique, the transfer height can be reduced from 0.5 inches to 0.3 inches. In some cases, elimination of a dual step pilot technique may be necessary in order to generate controlled and stable plasma arc. That is, dual threshold can create unstable arcs at currents below 25 amps for a 15 amp pilot current. New nozzle bore designs, such as those described below can be useful to increase the transfer height from 0.3 inches to 0.4 inches (e.g., a 40% increase in transfer height).

Another important parameter towards greater arc stretch is reduction in voltage drop with the arc stretch. Inherently, impedance of the arc increases with reduction in amperage. However, the nozzles described below can be useful to reduce the voltage drop with arc stretch and reduce the impedance of the arc, which can result in increasing the plasma efficiency.

In some embodiments, the computing device is configured to, and adjusts, the arc amperage magnitude of the plasma arc from the first arc amperage magnitude to the second arc amperage magnitude in a gradual (e.g., substantially continuously changing or non-stepwise) manner. In some cases, the generating the operational arc command includes increasing the system bus voltage as the arc amperage magnitude decreases. In some cases, adaptive current control provides for a gradual adjustment (e.g., as opposed to a step adjustment) across different current settings. In some examples, however, adjustments at low amperages can be done through step changes.

The plasma current can be adjusted and reduced by any of various techniques. For example, in some embodiments, the generating the operational arc command includes modifying a switching frequency of an inductor of the plasma cutting system. That is, responsive to detecting an arc transfer, the methods can initiate a transition from pilot mode to an operating mode that includes increasing a switching frequency of a power device within the plasma arc torch processing system to decrease the current provided to the consumables from the pilot mode current level to an operating mode current level and providing the gas to the torch at an operating mode gas pressure. In some cases, increasing switching frequency during pilot and low amperage operation can be achieved using variable gain systems. For example, using a continuously variable loop gain, the methods can include tightening a control bandwidth (e.g., control gain parameter) at the low end/low amperage, which can improve the control stability. Whereas, at typical conventional, higher amperage operations, increasing the switch frequency and tightening the range can have a negative impact, as at those values, the system typically responds to what is essentially noise.

In some embodiments, the systems can include a dynamic open circuit voltage (OCV), which can increase voltage output when running at a lower amperage by using a DSP where the OCV will raise the system bus voltage during low amperage operation and lower the bus voltage at higher amperage. A benefit of dynamic OCV can be longer arc stretch at lower current settings.

For example, the systems described herein can implement a digital control approach to control the open circuit voltage (OCV) and inverter switching frequency during a plasma gouging operation, such as for spot weld removal. A software-controlled power supply can dynamically adjust the OCV and inverter switching frequency as a function of the mode in which the arc is operating. Digital signal processing ("DSP") software can raise the OCV by raising the system bus voltage (V.Bus) when the output current is low. For example, the power supply outputs greater voltage if it is running at a low level of current (e.g. during the piloting phase and/or for spot weld removal). When the arc is operating at or near the full current, the power supply lowers the OCV (e.g., by lowering the bus voltage, V.Bus). As a result, the arc can be stabilized under low current, high voltage conditions. Thus, the current technology is effective for a wide range of output currents (e.g., between about 5 amps to about 100 amps).

The systems and methods described herein also improve arc stability by changing the inverter switching frequency for specified intervals, which can be implemented independently or in combination with the dynamic OCV. For example, in the pilot state or in the low current output mode, the inverter switching frequency can be increased. This increase can help reduce the output current ripple. Since the current through the inverter IGBTs is low in this mode, the switching loss and conduction loss can be low as well. Increasing the switching frequency also helps boost the output current feedback loop control bandwidth, which can further improve the plasma arc control stability at low current levels.

For example, in some cases, the switching frequency can be increased to at least about 50 kilohertz (kHz). For example, in some cases, the modifying the switching frequency includes tightening (e.g., narrowing) the control bandwidth as the arc amperage magnitude decreases. In some cases, the methods described herein can create stable arcs at 10 amps. For example, the switching frequency of a system operating at low amperage values can be adjusted to 56 kHz, with a plenum pressure as low as 20 psi, the current control and fast response provided by this new switching frequency and low plenum pressure creates a more stable/predictable arc. Further, when joined with consumable designs, such as a nozzle bore diameter that is about 0.028 inches with a distal end counterbore diameter that is about 0.04 inches, the arc can be further stabilized at low amperages. These features and parameters help to reduce the arc density of plasma exiting the plasma bore to about 2.4e6 (W/in$^2$), whereas some conventional systems have greater plasma arc densities of 3.9e6 (W/in$^2$) or 6.1e6 (W/in$^2$).

In some embodiments, the switching frequency can be constant for the power supply. For example, a high inductor switching frequency of about 56 kHz can be used with an adaptive current control algorithm. The current control gain parameters can function such that, at lower amperage setting, the current response rate is much faster for high impedance arc. At a higher amperage setting, the current control parameters can slow the current response rate to avoid oscillation in current signal.

With the current (e.g., reduced or ultra-low current) provided to the torch reduced, the plasma processing operation can be performed. For example, the torch can be used to perform a gouging or marking operation.

Alternatively or in addition to decreasing the plasma current from the pilot arc current level to the operational arc current level, methods can include decreasing pressure of plasma gas directed to the torch, which can create a more easily or better controlled processing environment. For example, the methods can include adjusting, using the computing system to adjust a pressure regulator (e.g., a tunable pressure regulator), the pressure of the gas flow to the plasma torch based on the transition from the pilot arc to an operational plasma arc. That is, the operating mode gas pressure can be less than the pilot mode gas pressure. In some embodiments, the adjusting the pressure includes adjusting the pressure so that a plenum pressure (e.g., the operating mode gas pressure) becomes less than about 25 pounds per square inch (psi) (e.g., less than about 20 psi, less than about 15 psi, less than about 10 psi).

In addition to, or alternatively to, the operational techniques described herein, in some aspects, consumables can be configured for better (e.g., more controlled) gouging techniques. In some cases, a nozzle can include a multi-stepped bore design with plurality of bore diameters. In some cases, the plurality of bore diameters can be arranged in a largest, small, medium, and second largest arrangement. In some embodiments, the shape of nozzle bore includes a conical inlet and outlet. In some embodiments, a smallest bore diameter can influence (e.g., be a primary influencer) on diffusion value.

For example, referring to FIGS. 2-6, in some embodiments, a nozzle (e.g., a gouging nozzle 300) for a plasma arc processing torch in a low-current gouging system can be formed of a generally cylindrical body 302 having an open proximal end 304 defining a plenum area 306 and a distal end 308 defining a floor 310 and a bore region 312 formed therethrough for conveying a plasma jet from the torch.

Figures 2, 3, 4:
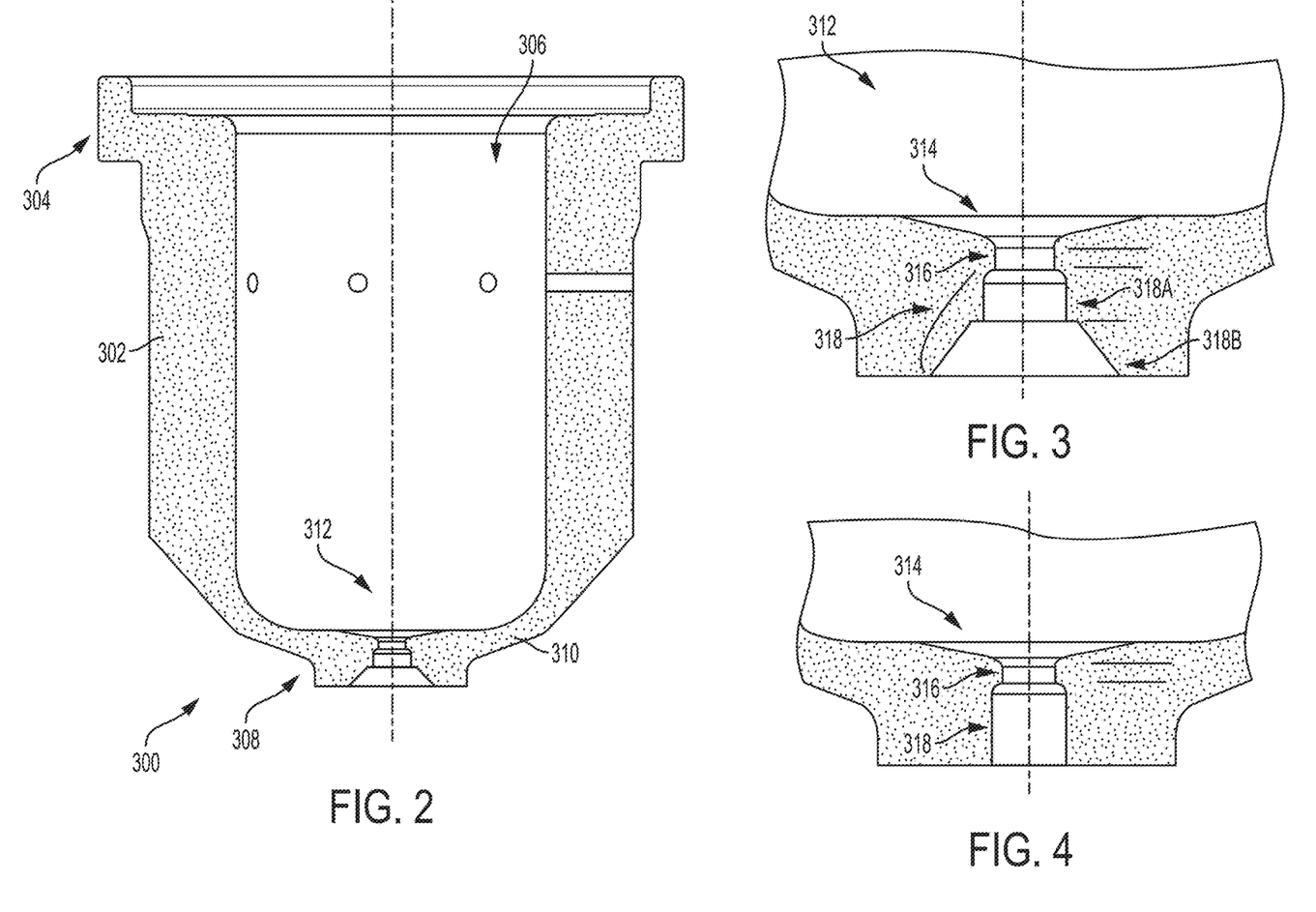
FIG. 2 is a cross-sectional view of an example nozzle having a multi-portion plasma bore.
FIG. 3 is an enlarged cross-sectional view of the multi-portion plasma bore of the nozzle of FIG. 2, illustrating a frustoconical distal portion.
FIG. 4 is an enlarged cross-sectional view of another example multiportion plasma bore, illustrating a counterbore at its distal end.

The bore region 312 includes several different portions (e.g., regions) that can be designed and configured to generate better flow as plasma gas that can be used to better control and disperse/diffuse plasma operations. For example, the bore region 312 can include a first, distal-most tapered inlet portion 314 formed along the floor of the distal end having a first axial (e.g., longitudinal) length. For example, the tapered inlet portion can include a frustoconical portion (e.g., chamfered edge) or a curved (e.g., rounded or filleted) edge.

The bore region 312 also includes a second, substantially cylindrical constricting bore 316 at a distal end of the inlet portion 314. The constricting bore 316 typically includes a diameter corresponding to (e.g., matching) an inner diameter of the tapered inlet portion 314. The diameter of the constricting bore 316 is also typically the minimum diameter of the bore region 312. The constricting bore 316 also has a second axial length. In some embodiments, the first axial length and the second axial length are within about 20% of one another.

The constricting bore 316 can have a diameter that is about 0.015 inches to about 0.045 inches (e.g., about 0.02 inches to about 0.04 inches (e.g., about 0.026 inches to about 0.035 inches (e.g., about 0.033 inches) (e.g., about 0.026 inches to about 0.032 inches))).

Additionally, the bore region 312 includes a third, counterformed (e.g., compounded counterbore (e.g., an enlarged, undercut region having a diameter generally larger than a diameter of the portion arrange relative proximally thereto)) portion 318 defined at a distal region of the substantially cylindrical constricting bore 316. The counterformed portion 318 has a diameter (e.g., an average diameter) that is greater than the diameter of the substantially cylindrical constricting bore 316 and a third axial length. In some embodiments, the third axial length is at least 20% greater than the first axial length and second axial length combined.

In some embodiments, the third axial length is greater than the second axial length. In some cases, the third axial length can be at least about 300% greater than the second axial length.

The counterformed portion 318 can include any of various configurations or larger openings. For example, as depicted in FIG. 3, the third, counterformed portion 318 can include a substantially cylindrical counterbore 318A and a frustoconical countersink 318B defined at a distal end of the substantially cylindrical counterbore 318A. In some embodiments, the counterformed portion 318 can include a frustoconical countersink formed at the distal end of the constricting bore 316. In some cases, the frustoconical countersink has a largest diameter that is greater than a largest diameter of the first, distal-most frustoconical inlet portion 314. In some embodiments, the largest diameter of the frustoconical countersink can be about 0.07 inches to about 0.11 inches. In some embodiments in which the counterformed portion includes a counterbore and a countersink, their respective axial lengths can be about the same.

In some embodiments, as depicted in FIG. 4, the third, counterformed portion 318 includes a substantially cylindrical counterbore. The counterformed portion 318 can have a diameter that is about 0.03 inches to about 0.12 inches (e.g., about 0.05 inches to about 0.1 inches (e.g., about 0.06 inches to about 0.09 inches (e.g., about 0.090 inches))). In some embodiments, the counterformed portion 318 can have a diameter that is at least about 20% greater than the constricting bore 316.

In some embodiments, the third, counterformed portion 318 includes two substantially cylindrical counterbore portions.

In some embodiments, the counterformed portion provides stepped diffusion in plasma arc energy while at the same time providing gradual expansion of plasma gas. This can be helpful to provide a stable plasma arc, which reduces arc impedance and increases arc stretch.

Other structural features can be implemented to help further increase control performance of plasma arc systems for gouging or marking of materials. For example, in addition or alternatively to the multi-portion plasma bore configurations described herein, nozzles can include various types of plasma plenum area venting configurations that help to create a more stable plasma arc inside the nozzle by increasing the swirl strength, but can also diffuse the plasma arc energy at a transfer point by cooling the workpiece. This can help to reduce the energy transfer from the arc onto the workpiece, particularly before the torch starts moving to perform a processing operation. In some aspects, the venting can help reduce plasma start/stop marks that could otherwise be formed when starting and stopping a plasma operation. For example, in some embodiments, the venting configurations (e.g., which can include discrete vent jets) described herein can reduce an amount of time for which an arc stays transferred at one particular location along a workpiece.

Figure 5:
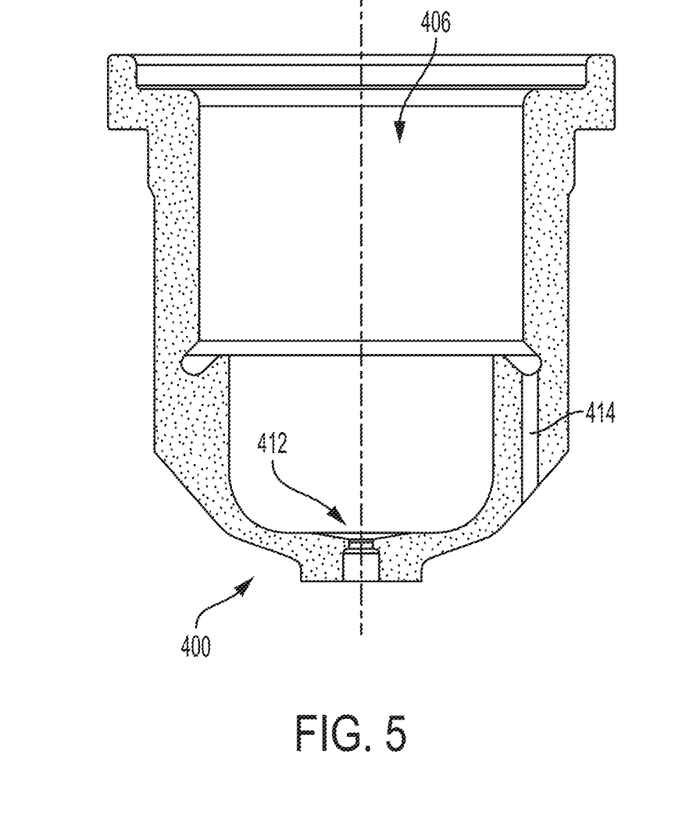
FIG. 5 is a cross-sectional view of another example nozzle having axial vents.
Figure 6:
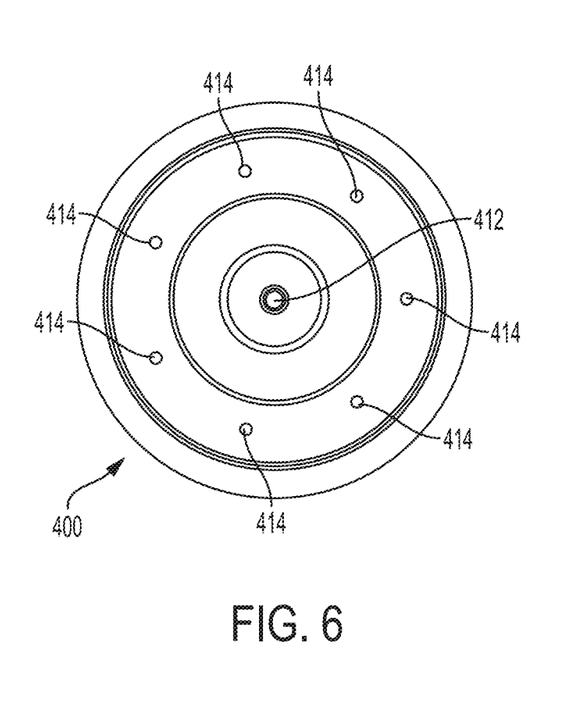
FIG. 6 is a bottom view of the nozzle of FIG. 5, illustrating a set of axial vents arranged around a central plasma bore.

For example, referring to FIGS. 5 and 6, in some embodiments, a nozzle 400 includes a set of vents (e.g., axial passages) 414 that fluidly vent the plasma plenum area 406 to a region outside of the nozzle, distally relative to the floor 410 of the body.

In some embodiments, the vents 414 are substantially axially defined. That is, in some cases, the vents can be axial flow passages shaped and disposed substantially parallel a longitudinal axis of the nozzle. As depicted in FIG. 5, the vents 414 are at least partially formed within a sidewall 416 of the cylindrical body. In some cases, the vents 414 are distributed substantially evenly about the bore region 412 as a consistent (e.g., common) radius from the bore region 412.

Using the systems and methods described herein, improved flexibility to control the power supply and plasma arc has been observed. Additionally, improved spot welding removal operation and control has been observed. Better control allows for finer feature gouging, such as removing a small amount of metal, which can be suitable for special applications, such as spot-weld removal. This also provides better arc control at the above gouging process, allowing non-expert users to perform the operation easily.

This process implementations described herein can also increase the robustness of low amp gouging. Further, the process implementations can reduce pop outs of plasma arcs at lower amperages by utilizing faster current control to produce more stable plasma arcs. Also, increased visibility with reduced arc impedance helps in getting longer arc stretch. Low plenum pressure of about 25 psi or below also helps with longer arc stretch and transfer height.

Adaptive current control also typically yields faster responses at low amperage and high voltage necessary for the pilot arc to transfer transition. At the same time, slow current controls help with stable high temperature plasma arc and eliminates oscillation in current, which can make operations using arcs at high temperature and with high current unstable.

While various embodiments have been described herein, it should be understood that they have been presented and described by way of example only, and do not limit the claims presented herewith to any particular configurations or structural components. Thus, the breadth and scope of a preferred embodiment should not be limited by any of the above-described exemplary structures or embodiments, but should be defined only in accordance with the following claims and their equivalents.

What is claimed:

1. A computer-implemented method for controlling a plasma arc in a plasma torch of a plasma cutting system in a low operating current mode, the method comprising:
   receiving, by a computing device disposed within the plasma power supply, a command to begin a plasma processing operation;
   generating, using the computing device, a pilot arc command to generate a pilot arc within the plasma torch, the generating of the pilot arc command including directing an electrical signal and a gas flow to the plasma torch, the electrical signal being configured to generate the pilot arc at a current having a first arc amperage magnitude that is at least about 15 Amps; and
   generating, using the computing device, an operational arc command to facilitate a transition from the pilot arc to an operational plasma arc upon determining that that the pilot arc has started to transfer from a nozzle to a workpiece, the generating of the operational arc command including adjusting the current directed to the plasma torch after arc transfer to be a second arc amperage magnitude that is lower than the first arc amperage magnitude and less than about 12 Amps, the second arc amperage used for a processing operation is generally lower than that used for the pilot arc.

2. The method of claim 1, wherein the operational plasma arc comprises a gouging arc.

3. The method of claim 1, wherein the first arc amperage magnitude has a value of less than about 20 A.

4. The method of claim 1, wherein the second arc amperage magnitude is at least about 25% lower than the first arc amperage magnitude.

5. The method of claim 1, wherein the generating the operational arc command includes modifying a switching frequency of an inductor of the plasma cutting system in response to a change in arc amperage magnitude.

6. The method of claim 5, wherein the modifying includes tightening the control bandwidth as the arc amperage magnitude decreases.

7. The method of claim 1, wherein the computing device adjusts the arc amperage magnitude in a gradual manner.

8. The method of claim 7, wherein the generating the operational arc command includes increasing a system bus voltage as the arc amperage magnitude decreases.

9. The method of claim 1, further comprising adjusting the pressure of the gas flow to the plasma torch based on the transition from the pilot arc to an operational plasma arc.

10. The method of claim 9, wherein the adjusting the pressure comprises adjusting the pressure so that a plenum pressure becomes less than about 25 PSI.

11. The method of claim 10, wherein the adjusting the pressure comprises adjusting the pressure so that a plenum pressure becomes less than about 10 PSI.

12. The method of claim 1, wherein the plasma torch is gas cooled.

13. A method of starting a plasma arc torch of a plasma arc torch processing system and performing a processing operation at a reduced plasma arc current, the method comprising:
   initiating a pilot arc in the torch between a set of consumables, the pilot arc having a pilot mode current level that is at least about 15 Amps, and providing a gas to the torch at a pilot mode gas pressure;
   responsive to detecting an arc transfer, initiating a transition from pilot mode to an operating mode, the initiating the transition comprising increasing a switching frequency of a power device within the plasma arc torch processing system to decrease the current provided to the consumables from the pilot mode current to an operating mode current level after arc transfer that is less than about 12 Amps and providing the gas to the torch at an operating mode gas pressure; and
   performing a plasma processing operation with the current at the operating mode current level that is less than about 12 Amps.

14. The method of claim 13, wherein the plasma processing operation comprises a gouging operation.

15. The method of claim 13, wherein the operating mode gas pressure is less than the pilot mode gas pressure.

16. The method of claim 13, wherein the switching frequency is at least about 50 kHz.

17. The method of claim 13, wherein the operating mode gas pressure is less than about 25 PSI.

18. The method of claim 13, wherein an arc transfer height with a pilot mode current level that is at least about 15 Amps is greater than about 0.3 inches.

* * * * *